Jan. 2, 1951     C. A. E. BEURTHERET     2,536,794
FREQUENCY MULTIPLIER
Filed Aug. 8, 1947     4 Sheets-Sheet 1
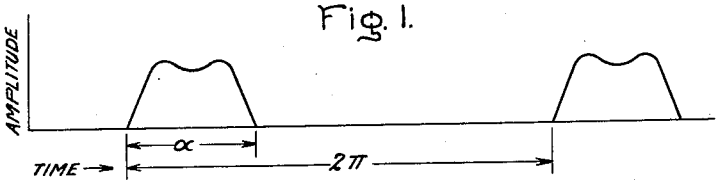
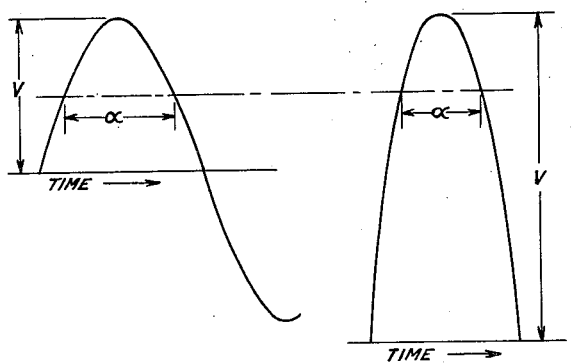
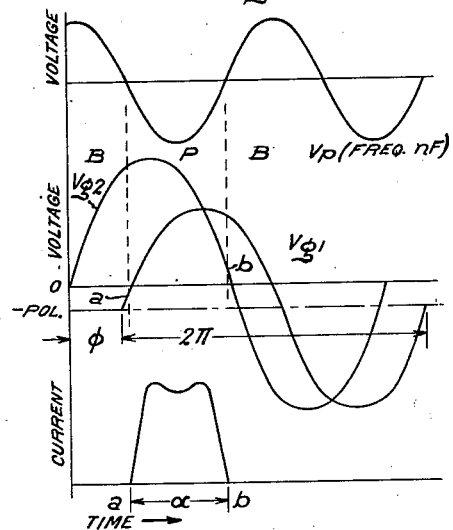
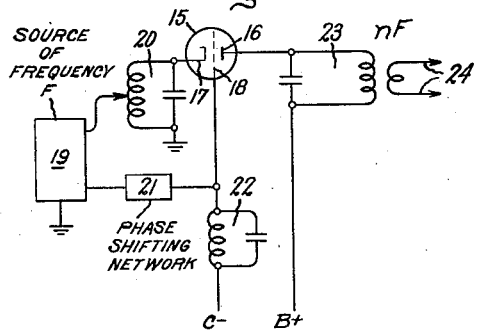
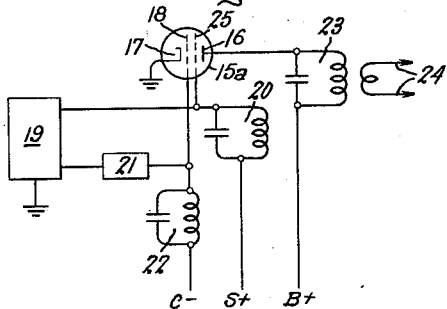
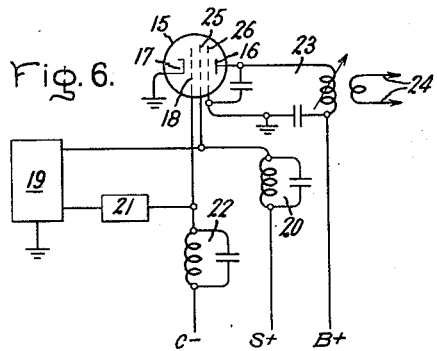
Inventor:
Charles A.E. Beurtheret,
by Merton D Moore
His Attorney.

Inventor:
Charles A. E. Beurtheret,
by Merton D. Mon
His Attorney.

Inventor:
Charles A. E. Beurtheret,
by Merton D. Mone
His Attorney.

Jan. 2, 1951  C. A. E. BEURTHERET  2,536,794
FREQUENCY MULTIPLIER

Filed Aug. 8, 1947  4 Sheets-Sheet 4

Inventor:
Charles A.E. Beurtheret,
by Merton D Moore
His Attorney.

Patented Jan. 2, 1951

2,536,794

UNITED STATES PATENT OFFICE 2,536,794

FREQUENCY MULTIPLIER

Charles A. E. Beurtheret, Paris, France, assignor to General Electric Company, a corporation of New York Application August 8, 1947, Serial No. 767,579
In France March 16, 1943

Section 1, Public Law 690, August 8, 1946
Patent expires March 16, 1963

3 Claims. (Cl. 250—36)

My invention relates to frequency multipliers and, more particularly, to systems for frequency multiplication where a high degree of multiplication is desired.

It is an object of my invention to provide a high degree of frequency multiplication without overloading the input circuit.

Another object of my invention is to provide a frequency multiplying system which permits a better control of the amplitude and waveform of the output waves.

A further object of my invention is to provide a scheme of frequency multiplication for application to the last stage of a power amplifier.

Still another object is to provide a combined oscillator-multiplier system which has improved performance characteristics.

Figure 21:
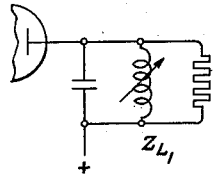
Figure 22:
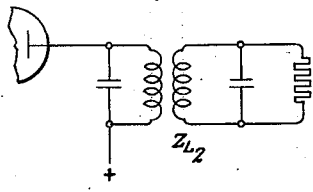
Figure 23:
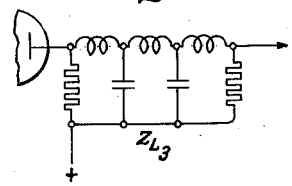

The features of my invention, which I believe to be novel, are set forth with particularity in the appended claims. My invention itself, however, together with further objects and advantages thereof may best be understood by reference to the following description taken in conjunction with the accompanying drawings in which Figs. 1, 2, 3 and 13 to 19 are curves explaining the theory of operation of my invention; Figs. 4 to 12 and 20 show diagrammatically electric circuits which represent variants of physical embodiments of the invention; and Figs. 21 to 23 are schematic representations illustrating variants of the output circuits of the system of Fig. 20.

The usual procedure in frequency multiplication by means of electron discharge device comprising several electrodes consists in designing the discharge device as an ordinary amplifier and in tuning its output circuit to a frequency $nF$, which is a harmonic of the excitation frequency $F$. The electronic current can be made rich in harmonics by having the tube operate intensively as a class C amplifier.

A study of the Fourier series representing this periodic current of frequency $F$, as illustrated in Fig. 1, shows that for each one of these successive harmonics of frequency $F$, $2F$, $3F$, $nF$, there exists an optimum value of pulse width, or angle of passage $a$. This value is variable depending on the form of impulse and depending further whether one wishes to increase the useful power or the efficiency. However, it is evidently of the order of magnitude of $\pi/N$, hence the lower it is, the higher is the order of the harmonic which is to be obtained.

For numerous physical reasons, especially the rapid decrease of the sinusoidal slope near the amplitude maximum, this accentuated class C operation, as illustrated in Fig. 2, has shortcomings which make it impractical as soon as "$n$" exceeds 3 or 4. Since the voltage V which is applied to the grid is higher than that which is collected at the anode, the discharge device will be unduly overloaded so that the frequency multiplication system has to be operated at low power and the entire amplification change must function at the final frequency $nF$.

The present invention covers a system which permits a better definition of pulse width, or angle of passage, down to very low values yet without overloading the input circuit.

It consists mainly in the separate control of the beginning and of the ending of the period during which the anode current flows. This control is obtained by means of two distinct electrodes that are subjected to the influence of the control frequency $F$, said electrodes being subjected to periodic voltages of the same frequency $F$ but of different phases that are suitably regulated one with respect to the other.

The voltages applied to the diverse electrodes and the discharge device, have at a given instant an overall control effect as regards the electronic current with the result that there occurs in each cycle of frequency $F$, a blocking period $B$, as well as a pass period $P$ the width of which depends on the amplitudes, the phases and the shapes of the periodic voltages and also on the value of the continuous voltages applied to the diverse electrodes. This arrangement, as illustrated in Fig. 3, makes it possible to vary the angle of passage $a$ as a function of the phase displacement $\phi$ and to obtain a width of passage angle which is favorable to the production of a harmonic of frequency $nF$ and that under the optimum conditions of power and efficiency. This is brought about by having each electrode act at the moment when the slope of the voltage which is applied to it, passes through the maximum or near the latter.

Referring to Fig. 4 of the drawing, the harmonic generator shown therein comprises an electronic discharge device 15 having an anode 16, a cathode 17 and control grid 18. A source 19 of frequency F is connected to the cathode 17 by means of the tuned circuit 20. The source 19 is also connected to the control grid 18 through a phase shifting circuit 21 which may be any conventional system which is well known to those skilled in the art. The grid bias, as indicated by the conventional C— symbol, is connected to the grid 18 through the tuned circuit 22. The anode 16 is connected to a tuned circuit 23 which is tuned to the desired harmonic frequency $nF$. The high voltage anode supply as indicated by the conventional B+ symbol and may be from any suitable source.

Fig. 4 represents the application of the invention to the particular case where the control of the beginning and of the ending of the period of anode current conduction is obtained by means of signals applied to the grid and the cathode of a triode tube. It will be seen that on the one hand the cathode 17 is subjected to a voltage of frequency F while on the other hand the grid 18 is subjected to a voltage of the same frequency F but through the intermediate phase shifting network 21. As previously indicated from the analysis of Figs. 1 and 3, this results in a class C type of operation, the anode current being initiated and terminated only within each positive half-cycle of the voltage from source 19, when the combined effect of the two control voltages overcomes the C— bias. The duration of each anode current pulse is therefore always less than the period of a half-cycle and its width, or angle of passage, may readily be adjusted by phase shifting circuit 21 so as to give maximum output at the desired harmonic frequency.

Figs. 5 to 12 represent variants of physical embodiments of the invention and are based on the same operating principles as those outlined in the preceding paragraphs. Corresponding elements have been given corresponding reference numerals. Inasmuch as the circuits and components are somewhat similar to those of Fig. 4, it is believed that they will be readily understood without a detailed explanation. For simplicity, only significant differences will be described.

Figure 7:
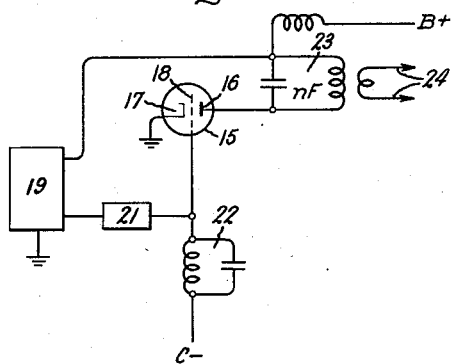
Figure 8:
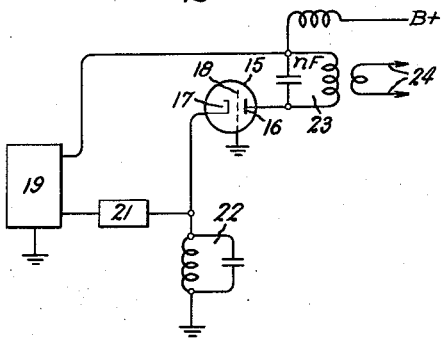

In Fig. 5, the discharge device 15a is a tetrode having an anode 16, a cathode 17, a control grid 18 and a screen 25. The control is accomplished by connecting the source 19 both to the screen 25 and through the phase shifting circuit 21 to the control grid 18. In Fig. 6 an embodiment is illustrated that shows how the control may be accomplished by way of signals applied to the control grid 17 and screen 25 of a pentode 15b, having a grounded suppressor grid 26. In Fig. 7, the control is accomplished by way of signals applied to the anode 16 and the grid 18 of a triode 15. In Fig. 8 the control is accomplished through signals applied to the cathode 17 and the anode 16 of a triode 15.

It will be noted that in certain circuits, as shown in Figs. 7 and 8, the multiplier stage is energized by anode voltage through the excitation stage 19, which must then furnish an important amount of power. However, this power is obtained under good conditions at the relatively moderate frequency F and an important part is transformed by the multiplication into high frequency energy at the frequency $nF$ with a high efficiency.

Figure 9:
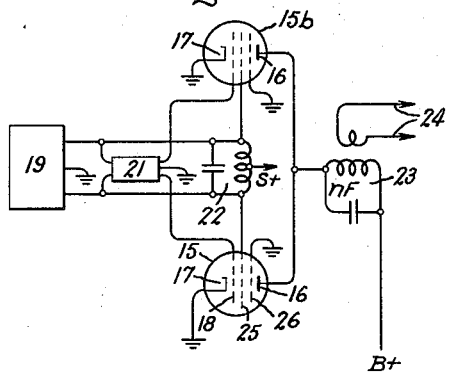
Figure 10:
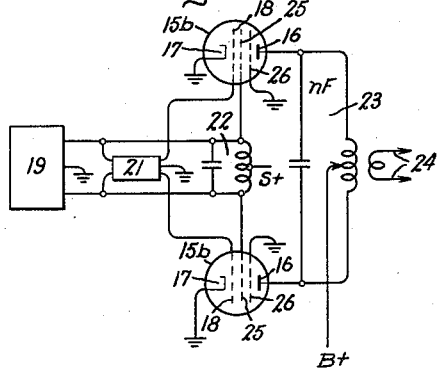

The invention can also be applied to the socalled psuedo-symmetrical, or balanced, circuits. Two examples of such circuits are represented in Figs. 9 and 10, designed in accordance with known principles for production of odd and even harmonic outputs, respectively. The same notations have been used as in the preceding figures.

It goes without saying that all the circuits can be applied, not only to circuits operating for transmission of telegraphic signals but also to circuits carrying amplitude modulation signals, especially by the control of the anode supply voltage, as well as to circuits for amplification of frequency modulated waves. In the latter case, the frequency deviation is itself multiplied by the same factor as the mean frequency. It is, therefore, reduced throughout the amplification chain as the frequency is multiplied in the final stage.

Figure 11:
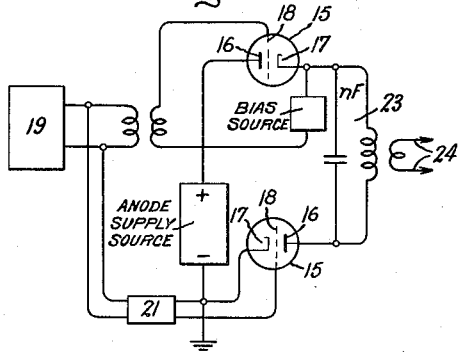
Figure 12:
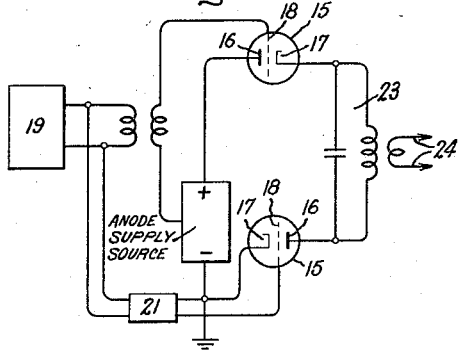

In all of the physical embodiments previously mentioned, it has been assumed that the two control electrodes subjected to voltages of the same frequency by having a phase displacement with respect to each other belong to one and in the same electron tube. However, it is also possible still within the scope of the present invention to consider circuits in which the opening and the closing of the period, during which a current flows, is controlled by two independent discharge devices connected in series circuit relationship. Figs. 11 and 12 give two examples of simple circuits which embody the invention in that form. The same notations as in the preceding figures have been retained and it will be possible to understand the nature of the variant under consideration without a detailed explanation of the circuit construction.

A particularly interesting application of this scheme is in regard to frequency multiplication at the last power stage of a frequency modulation system. With this method the intermediate amplification chain may be simpled as it can now be operated at a moderate frequency F up to the control circuits of the last stage. The only circuit which is subject to the high $nF$ frequency is then in the output circuit of a stage which is particularly simple since there is no necessity to neutrodyne it and since the impedance of its input circuit is negligible at the frequency of its output circuits.

Both the frequency and the power limit which are imposed by the currents flowing through the control grid and also by the transit time of the electrons, are pushed back to a certain extent when the above method is applied.

Figure 15:
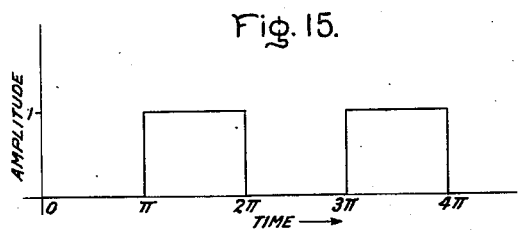

Another interesting application of the scheme is its application to the generation of multiple harmonic frequencies of variable order. Some standard frequency generators, such as multivibrators, in prior art systems used for the generation of harmonic frequencies, made extensive use of "notched" currents obtained by relaxation oscillations, or "mangled" sinusoidal oscillations by means of a limiter. The output in such cases is rich in odd harmonics, such as illustrated in Fig. 15, whose order can be raised but whose amplitude decreases rapidly as the order is gradually increased, as shown by the following table:

| Order | 1 | 2 | 3 | 4 | 5 | 6 | 7 | 8 |
|---|---|---|---|---|---|---|---|---|
| Amplitude | 0.64 | 0 | 0.21 | 0 | 0.13 | 0 | 0.09 | 0 |
| Order | | 9 | 10 | 11 | 12 | 13 | 14 | 15 |
| Amplitude | | 0.07 | 0 | 0.06 | 0 | 0.05 | 0 | 0.04 |

Figure 17:
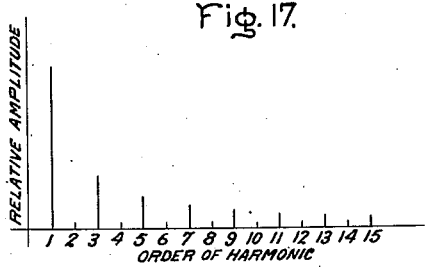

These relative values for the different harmonics are represented by the vertical bars in Fig. 17.

Figure 16:
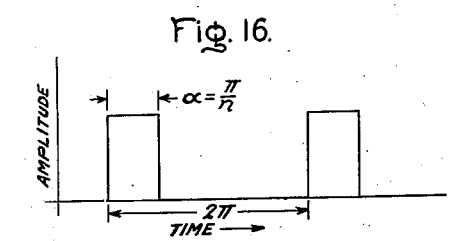

This rapid diminishing of successive amplitudes of the harmonics presents a practical inconvenience, namely in the case where these frequencies are of weak order and must be introduced into a frequency mixer. It is then preferable to use short impulses, such as those represented by Fig. 16. These impulses can be obtained with the aid of a multiple vibrator of dissymmetrical characteristics. Such impulses as shown in Fig. 16 have an angle of passage $a$ equal to $\pi/N$ and comprise the impulse frequency components F, and its harmonic frequency 2F, 3F, etc., even and odd. The relative amplitudes of harmonics appearing in the output are a function of the order N of the harmonics selected. For example, where every 10th harmonic is selected, i. e., where $N=10$, development of the Fourier series gives the amplitude of successive harmonics according to the table below:

| Order | 1 | 2 | 3 | 4 | 5 | 6 | 7 |
|---|---|---|---|---|---|---|---|
| Amplitude | 0.1 | 0.099 | 0.097 | 0.094 | 0.090 | 0.086 | 0.081 |

| Order | 8 | 9 | 10 | 11 | 12 | 13 | 14 | 15 |
|---|---|---|---|---|---|---|---|---|
| Amplitude | 0.076 | 0.070 | 0.064 | 0.057 | 0.050 | 0.044 | 0.037 | 0.030 |

Figure 13:
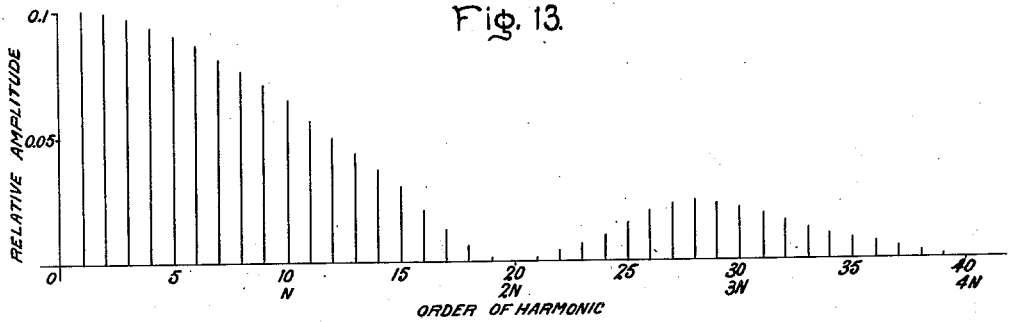

Fig. 13 represents the amplitudes of successive harmonics as far as the 40th, where $N=10$. It will be noted that, contrary to the case of Fig. 17, the lower harmonics have amplitudes which are very nearly alike. The harmonic of order N again has an amplitude equal to 64% of the amplitude of the fundamental frequency. But again it is more advantageous to use the procedure described above, in connection with Figs. 4–12, which gives less rectangular impulses and whose shape is that more nearly as represented by Fig. 19. In that figure, where the impulse has a form of half a sine wave, the relative amplitudes of the harmonics are given by Fig. 18 where $N=10$. The first fifteen harmonics have, in this case, the following values:

| Order | 1 | 2 | 3 | 4 | 5 | 6 | 7 |
|---|---|---|---|---|---|---|---|
| Amplitude | 0.064 | 0.064 | 0.063 | 0.062 | 0.061 | 0.059 | 0.059 |

| Order | 8 | 9 | 10 | 11 | 12 | 13 | 14 | 15 |
|---|---|---|---|---|---|---|---|---|
| Amplitude | 0.055 | 0.053 | 0.050 | 0.048 | 0.045 | 0.042 | 0.039 | 0.036 |

Figure 18:
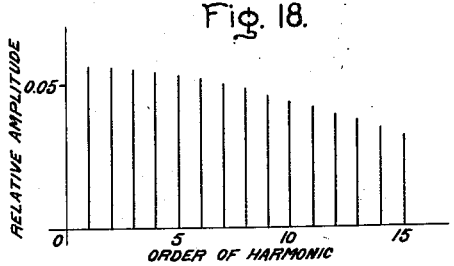
Figure 19:
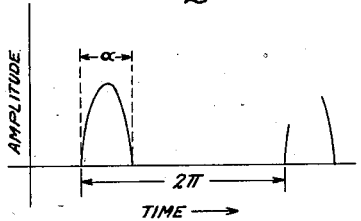

The comparison of frequency spectrums given by Figs. 17, 13 and 18 clearly shows the remarkable constancy of amplitude of the first ten harmonics (in the case where $N=10$) and the advantage of the method conforming to my invention.

Figure 14:
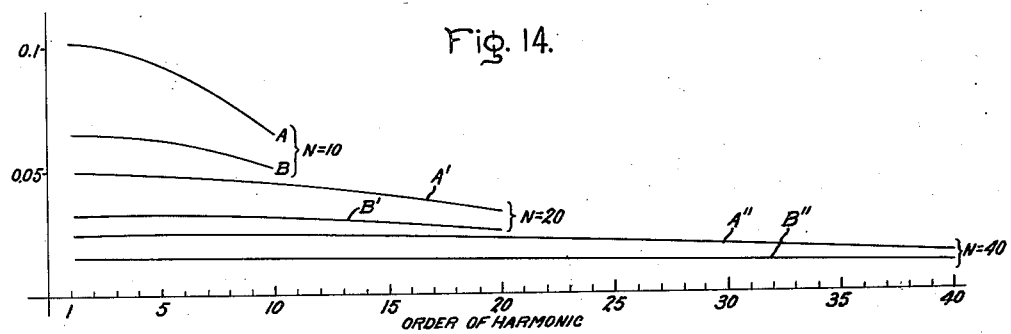

Fig. 14 shows the shape of the envelope of the frequency spectrum for conditions where $N=10$, $N=20$ and $N=40$. The curves marked A and B show the limits within which will lie the envelope curve of impulses whose actual form will be intermediate between those represented respectively by Figs. 16 and 19. Similar limits A', B' and A'', B'' are also indicated for values of $N=$ to 20 and 40 respectively.

Figure 20:
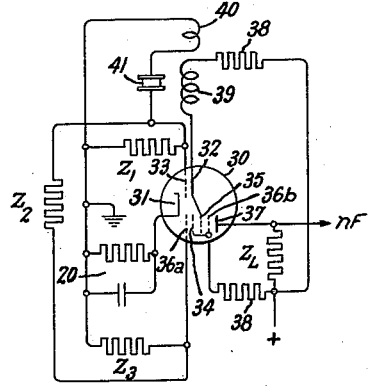

There is represented in Fig. 20 a particular realization of the invention in which one uses a triode-hexode 30 and a crystal 41 and combines a local oscillator with a frequency multiplier in a single tube. In Fig. 20, the electron discharge device 30 has a common cathode 31, a screen grid 33 and an anode 32 in the oscillator circuit. The anode 32 is connected within the tube to a control grid 35 of the hexode section. In addition, the device 30 has the grids 34, 36a, and 36b and the anode 37. The phase shifting impedances are represented by the letters $Z_1$, $Z_2$, and $Z_3$, which I have shown as resistors for illustration but they may be any suitable impedances. The output load impedance $Z_L$ is also for purposes of illustration shown as resistance. Figs. 21, 22 and 23 illustrate various other types of load impedances $Z_{L1}$, $Z_{L2}$ and $Z_{L3}$ that may be used according to the results desired. Inasmuch as they are well known to those skilled in the art, a detailed explanation of their structure will be omitted for simplicity.

Referring now to Fig. 21, if it is desired to isolate one of the harmonics, the amplification of this circuit should increase proportionately as the order of the harmonics increases. Then it is preferable to have the capacity fixed and to vary the inductance, the load being made up of a fixed shunting resistance. This circuit will be controllable in a continuous manner or may be switched or preset to several harmonics. In certain applications the selectivity of an oscillating circuit will be insufficient and it will be necessary to use a more complex network comprising several circuits, as illustrated in Fig. 22. It may also be used with a low pass filter limiting the band transmitted to a predetermined number of harmonics, as illustrated by Fig. 23, or it may be used by combining two or more circuits such as described above, with an aim to produce simultaneously several definite frequencies. As an example of application, a harmonic generator can be made using only one tube and oscillating on a frequency multiple of ten. It may be crystal controlled and, by simple switching of the output circuit, it may provide any one of ten successive harmonics of the same amplitude, thus constituting a direct-reading, standard decade generator. This generator may be built, for example, according to the diagram of Fig. 20, the output impedance $Z_L$ being made up of ten selectable circuits, such as shown by Fig. 22, each preset on one of ten harmonic frequencies and selected by means of a switch depending upon the frequency desired.

While I have illustrated and described a particular embodiment of my invention, modifications thereof will occur to those skilled in the art. I desire it to be understood, therefore, that my invention is not to be limited to the particular arrangement disclosed and I intend in the appended claims to cover all modifications which do not depart from the spirit and scope of my invention.

What I claim as new and desire to secure by Letters Patent of the United States is:

1. A harmonic wave generator comprising an electron discharge device having an anode electrode, a cathode electrode and a control electrode, a source of fundamental frequency voltage, means to apply a portion of the output of said source to one of said electrodes, means to apply another portion of said output, displaced in phase relation with respect to said first portion, to another of said electrodes, said phase displacement being less than the period of a half-cycle of said voltage, means to bias said device so that a pulse of anode current is initiated and terminated only once per cycle of said voltage when the combined effect of said portions overcomes the effect of said bias, the duration of said pulse being less than the period of a half-cycle of said voltage, and means to select any desired harmonic of said fundamental frequency contained in the series of anode current pulses thus produced.

2. A harmonic generator comprising a duel electron discharge device having a cathode, two anodes, a first control electrode associated with one of said anodes, a second control electrode associated with the other of said anodes, and a third control electrode associated with said other anode, means comprising a crystal connected in circuit with said cathode and said first anode for generating oscillations of fundamental frequency, means for supplying said oscillations to said second control electrode, means for shifting the phase of said oscillations, means for supplying said phase-shifted oscillations to said third control electrode, said phase shift being less than the period of a half-cycle of said oscillations, means to adjust the effective bias applied to the electrodes associated with said other anode so that a pulse of anode current is initiated and terminated therein only once per cycle of said oscillations when the combined effect of the oscillations applied to said second and third control electrodes overcomes said effective bias, the duration of said pulse being less than the period of a half-cycle of said oscillations, and means to select any desired harmonic of said fundamental frequency contained in the series of anode currents pulses thus produced.

3. A harmonic generator comprising an electron discharge device having a multiplicity of electrodes, a source of periodic voltage of fundamental frequency, means for impressing said voltage on one of said electrodes, means including adjustable phase shifting means for impressing said voltage on another of said electrodes with a phase shift of less than the period of a half-cycle of said voltage, means to bias said device so that a pulse of anode current is initiated and terminated only once per cycle of said voltage when the combined effect of said voltages overcomes the effect of said bias, the duration of said pulse being less than the period of a half-cycle of said voltage, means to adjust said phase shifting means to vary the duration of said pulse and means to select any desired harmonic of said fundamental frequency contained in the series of anode current pulses thus produced.

CHARLES A. E. BEURTHERET.

REFERENCES CITED

The following references are of record in the file of this patent:

UNITED STATES PATENTS

| Number | Name | Date |
|---|---|---|
| 2,162,806 | Fay | June 20, 1939 |
| 2,191,903 | Aldous | Feb. 27, 1940 |
| 2,253,575 | Norton | Aug. 26, 1941 |
| 2,262,380 | Bach | Nov. 11, 1941 |
| 2,370,637 | Charchian | Mar. 6, 1945 |
| 2,422,742 | Odessey | June 24, 1947 |

FOREIGN PATENTS

| Number | Country | Date |
|---|---|---|
| 380,144 | Great Britain | Sept. 15, 1932 |